Sept. 20, 1927.  1,642,729
G. GODDU
FASTENING INSERTING MACHINE
Filed April 19, 1924   7 Sheets-Sheet 1

INVENTOR.
George Goddu
By his Attorney
Nelson W. Howard

Sept. 20, 1927. 1,642,729
G. GODDU
FASTENING INSERTING MACHINE
Filed April 19, 1924 7 Sheets-Sheet 2

INVENTOR.
George Goddu
By his Attorney
Nelson W. Howard

Sept. 20, 1927.   G. GODDU   1,642,729
FASTENING INSERTING MACHINE
Filed April 19, 1924   7 Sheets-Sheet 3
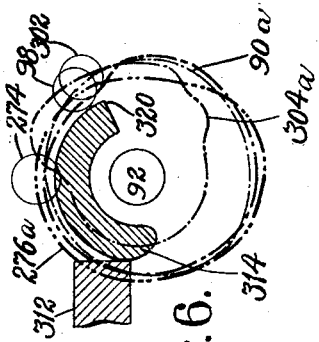
Fig. 6.
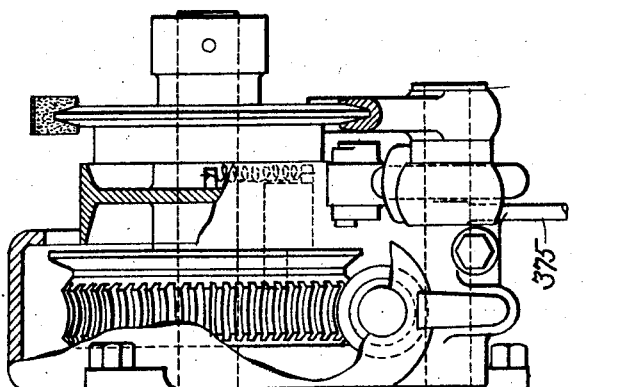
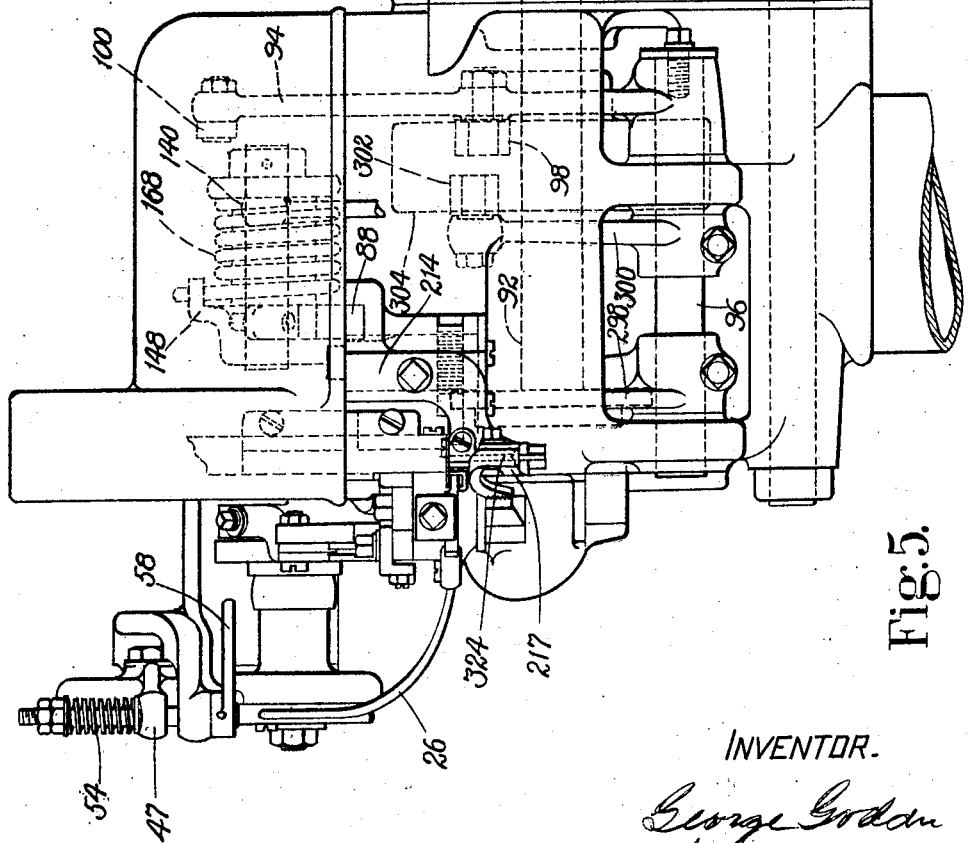
Fig. 5.
INVENTOR.
George Goddu
By his Attorney,
Nelson W Howard

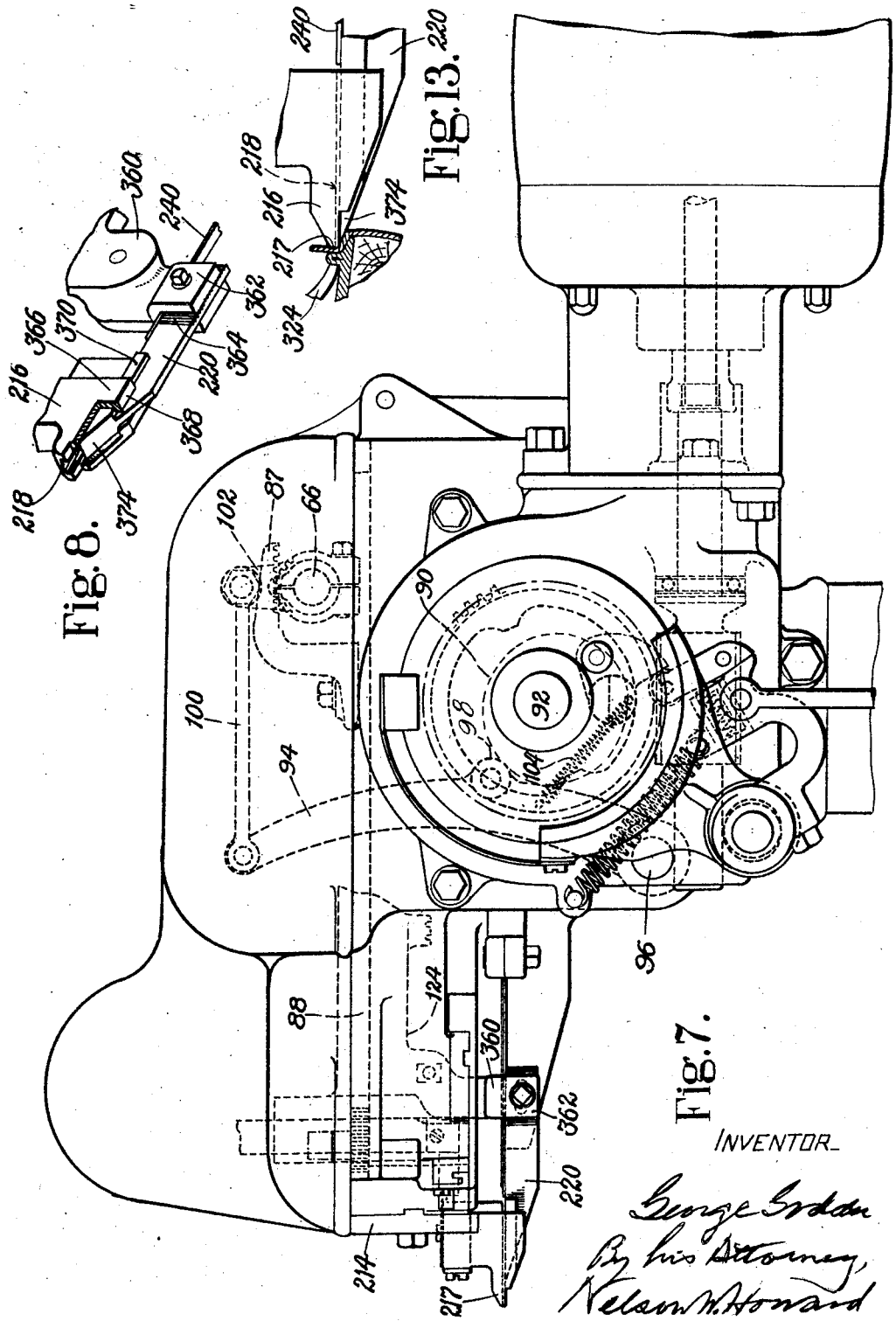

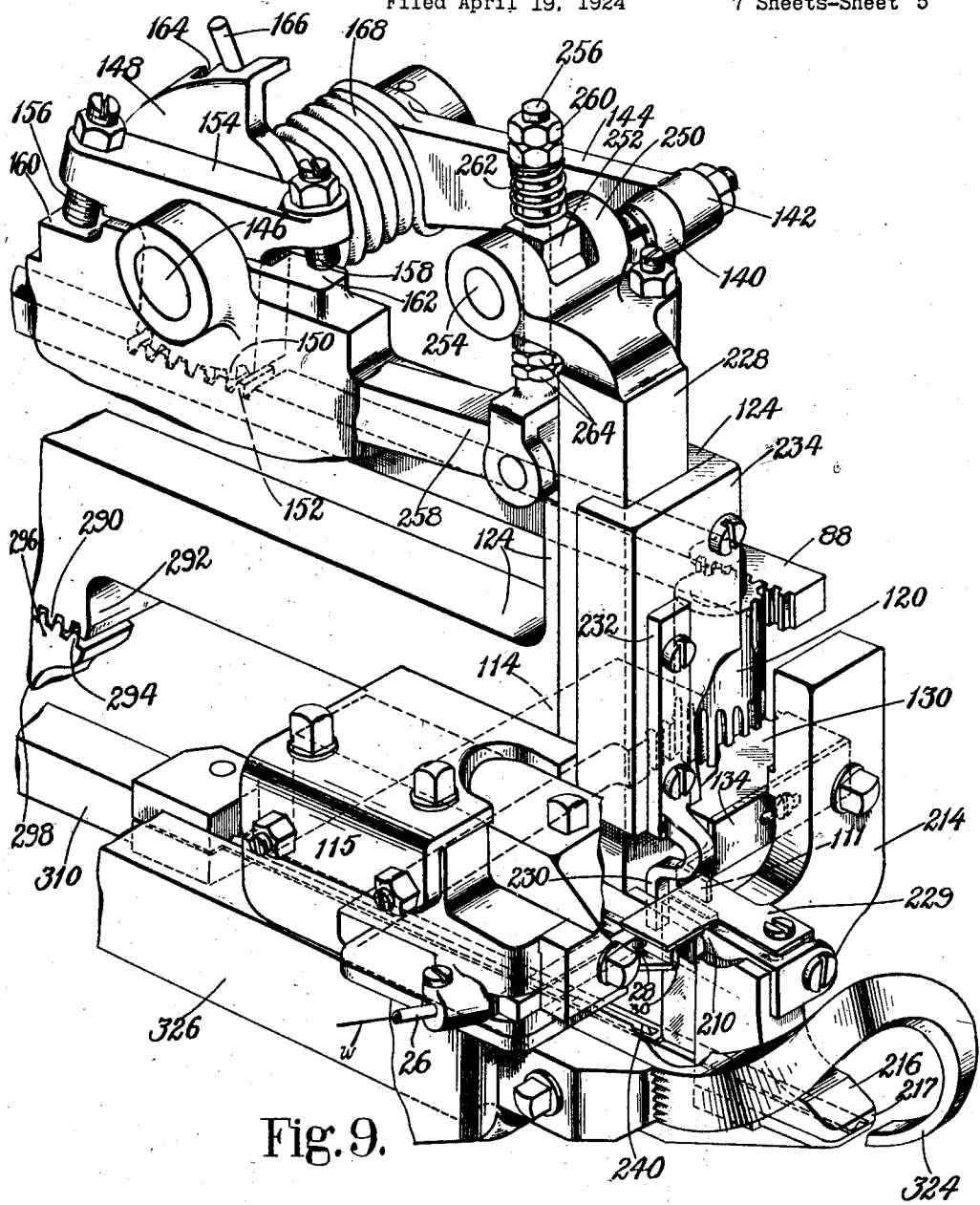

Sept. 20, 1927.   
G. GODDU   
1,642,729
FASTENING INSERTING MACHINE
Filed April 19, 1924   7 Sheets-Sheet 6
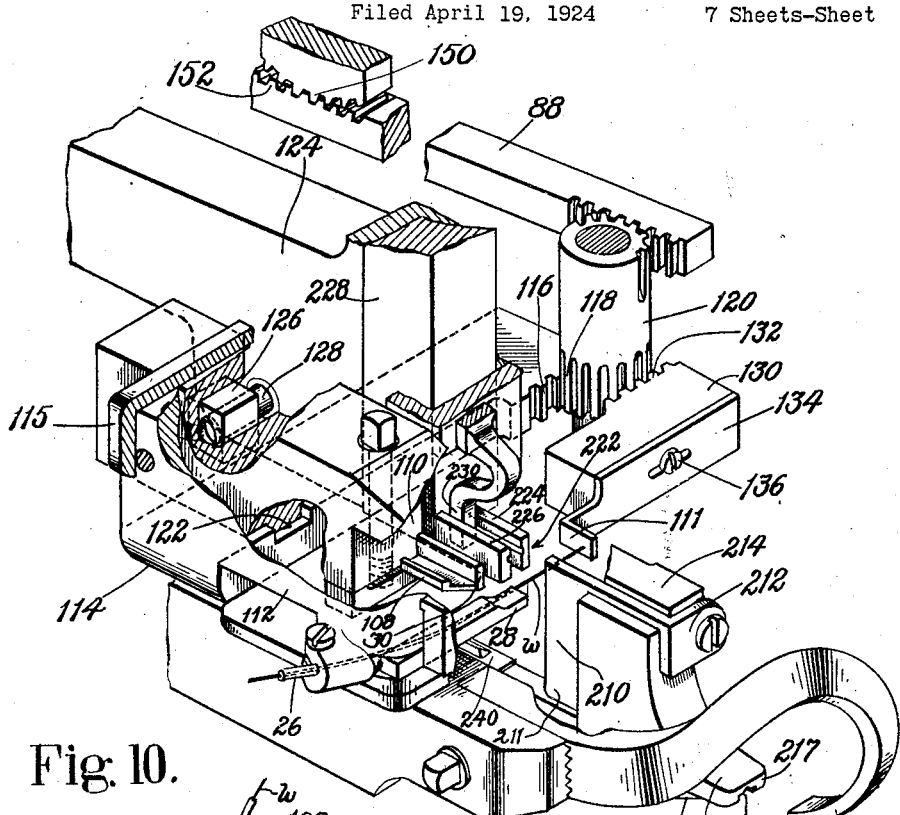
Fig. 10.
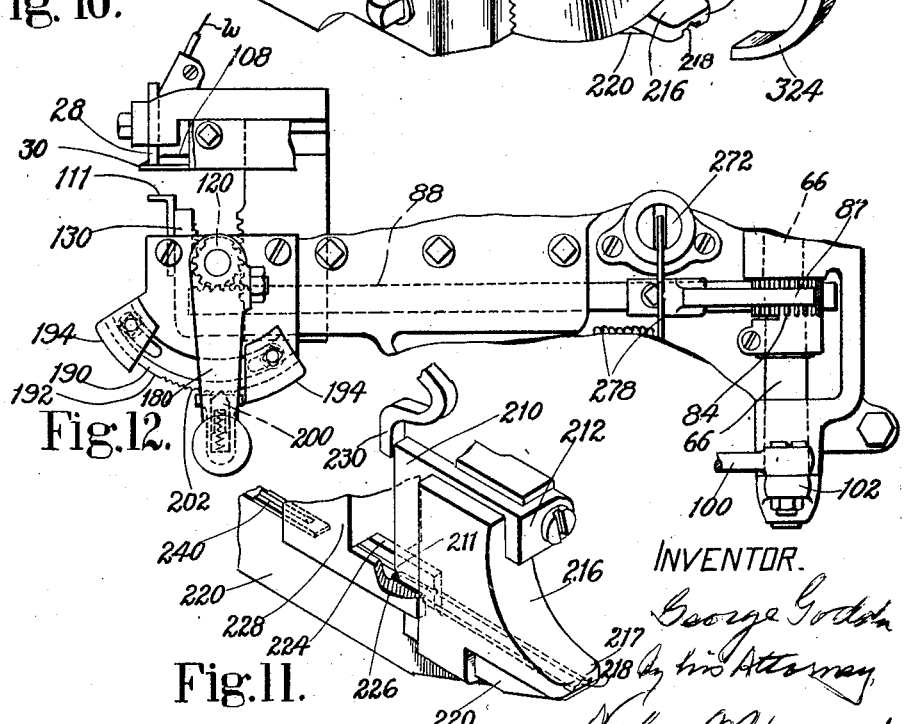
Fig. 12.
Fig. 11.
INVENTOR.
George Goddu
by his Attorney
Nelson W. Howard Sept. 20, 1927.

G. GODDU 1,642,729

FASTENING INSERTING MACHINE

Filed April 19, 1924

INVENTOR.
George Goddu
By his Attorney,
Nelson W. Howard

Patented Sept. 20, 1927.

1,642,729

UNITED STATES PATENT OFFICE.

GEORGE GODDU, OF WINCHESTER, MASSACHUSETTS, ASSIGNOR TO UNITED SHOE MACHINERY CORPORATION, OF PATERSON, NEW JERSEY, A CORPORATION OF NEW JERSEY.

FASTENING-INSERTING MACHINE.

Application filed April 19, 1924. Serial No. 707,767.

This invention relates to machines for inserting fastenings and is herein illustrated as embodied in a machine which forms staples from continuous material, such as wire, and then drives the staples into the work.

It is an object of the invention to provide a machine of this type which will be simple in construction, accurate in its adjustments to provide fastenings of different lengths, and particularly effective in the formation and insertion of fastenings exactly suited to the varying characteristics of the work operated upon.

In the attainment of this object and in accordance with one feature of the invention, the wire feeding means of the illustrated machine is yieldingly operated to feed the wire stock against an abutment which is adjustable by means which also controls the wire feeding means so that the length of wire for a fastening may be accurately varied in accordance with the desired length of fastening. Preferably, and as shown, the means which controls the wire feeding means and the abutment also effects and controls adjustment of the wire cutting means.

Another feature of the invention comprises the combination of a wire cutting means and a movable abutment disposed on opposite sides of a fastening forming member and arranged to be simultaneously adjusted rectilinearly toward and from each other so that the two prongs or legs of a staple fastening may be changed to an equal extent whenever the lengths of the fastenings are varied in accordance with changes in the thickness of the work. In one illustrated embodiment of the invention the operator may predetermine the length of fastenings to suit the work through the operation of a manually controlled lever. The invention contemplates also, and as illustrated includes, means controlled by the work itself for determining the length of fastening to be inserted at any given point.

In order that each fastening may be provided with a straight cross-bar, provision is made for the co-operation of a die with one of the fastening forming members. This illustrated arrangement necessitates the transferring of the staple from forming position to driving position and improved means is provided for preventing displacement of the fastening during this transfer movement. Preferably, and as shown, a prolongation of the inside fastening forming member serves as a means for preventing displacement of the fastening with respect to the outside forming member during its transfer by said member.

The invention contemplates also the provision of improved means for wiping the marginal portion of an upper of a shoe over the marginal portion of a sole where the machine is employed in securing the upper to a lip or rib on a sole assembled with a last, an important function of the wiping means being to effect a smoothing down of the upper to provide a completely adequate seat for the welt during welting operations on the shoe. As illustrated, the wiper member constitutes also the lower wall of the nozzle which supports the fastening and the fastening driver, the wiper operating, in the manner described, prior to the insertion of the fastening which is guided along the upper surface of the wiper and into the work after the latter has been smoothed down at the extreme end of the wiper.

Other features of the invention and novel combinations of parts will be described in the detailed specification and pointed out in the appended claims.

In the drawings,

Fig. 5 is a view of the machine in front elevation, parts being broken away to show the structures beneath more clearly;

Fig. 6 is a cross sectional view of the fastening driver cam together with a diagrammatic representation of a group of cam paths in which the paths of movement of the centers of the respective cam rolls are indicated by lines of different characteristics;

Fig. 7 is a view in side elevation looking from the opposite direction to that in Fig. 1;

Fig. 8 is a detail view of the wiper mechanism;

Fig. 9 is an enlarged perspective of the staple fastening, forming and driving devices;

Fig. 10 is a view similar to Fig. 9 with parts broken away to show more clearly the wire cutting and fastening forming devices;

Fig. 11 is a detail of parts shown in Fig. 10;

Fig. 12 is a plan view similar to Fig. 4 showing a hand operated lever for controlling the length of fastening to be formed;

Fig. 13 is a detail view showing the clamping means engaged with the work; and

Figure 1:
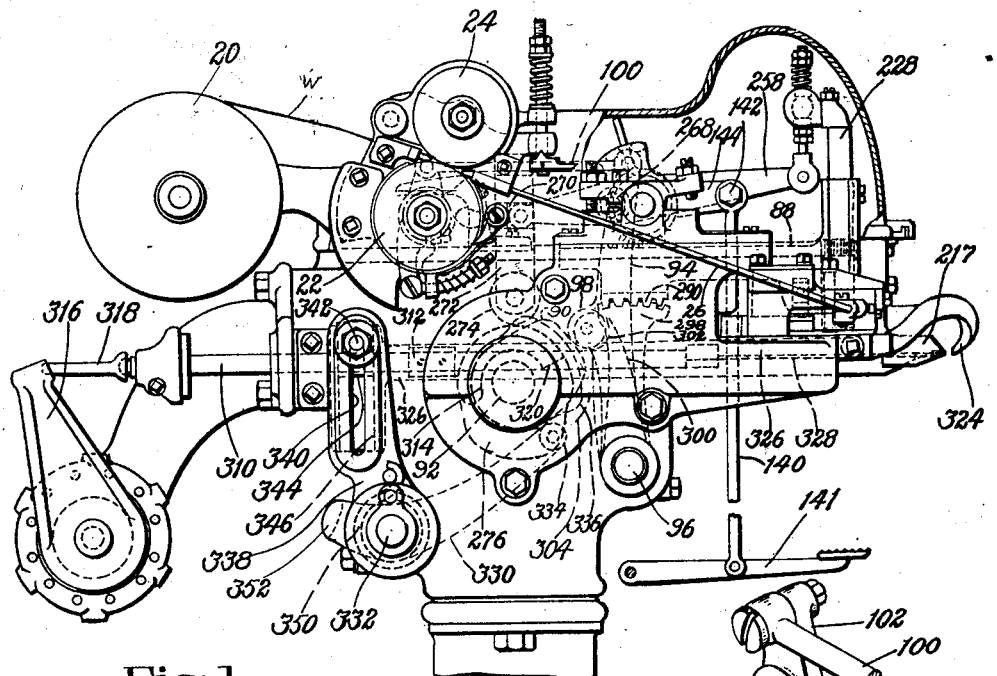
Figure 1 is a view in side elevation and partly in section of one embodiment of the invention.
Figure 2:
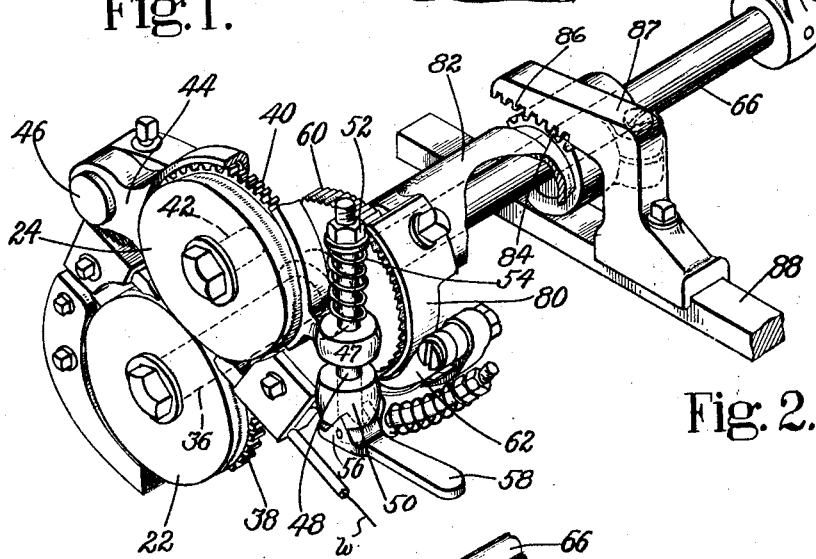
Fig. 2 is a detail in perspective showing operating mechanism for the wire feeding means.
Figure 3:
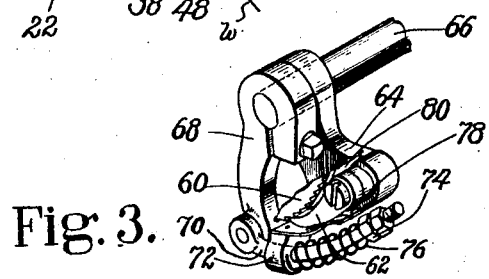
Fig. 3 is a detail of part of the mechanism of Fig. 2.
Figure 4:
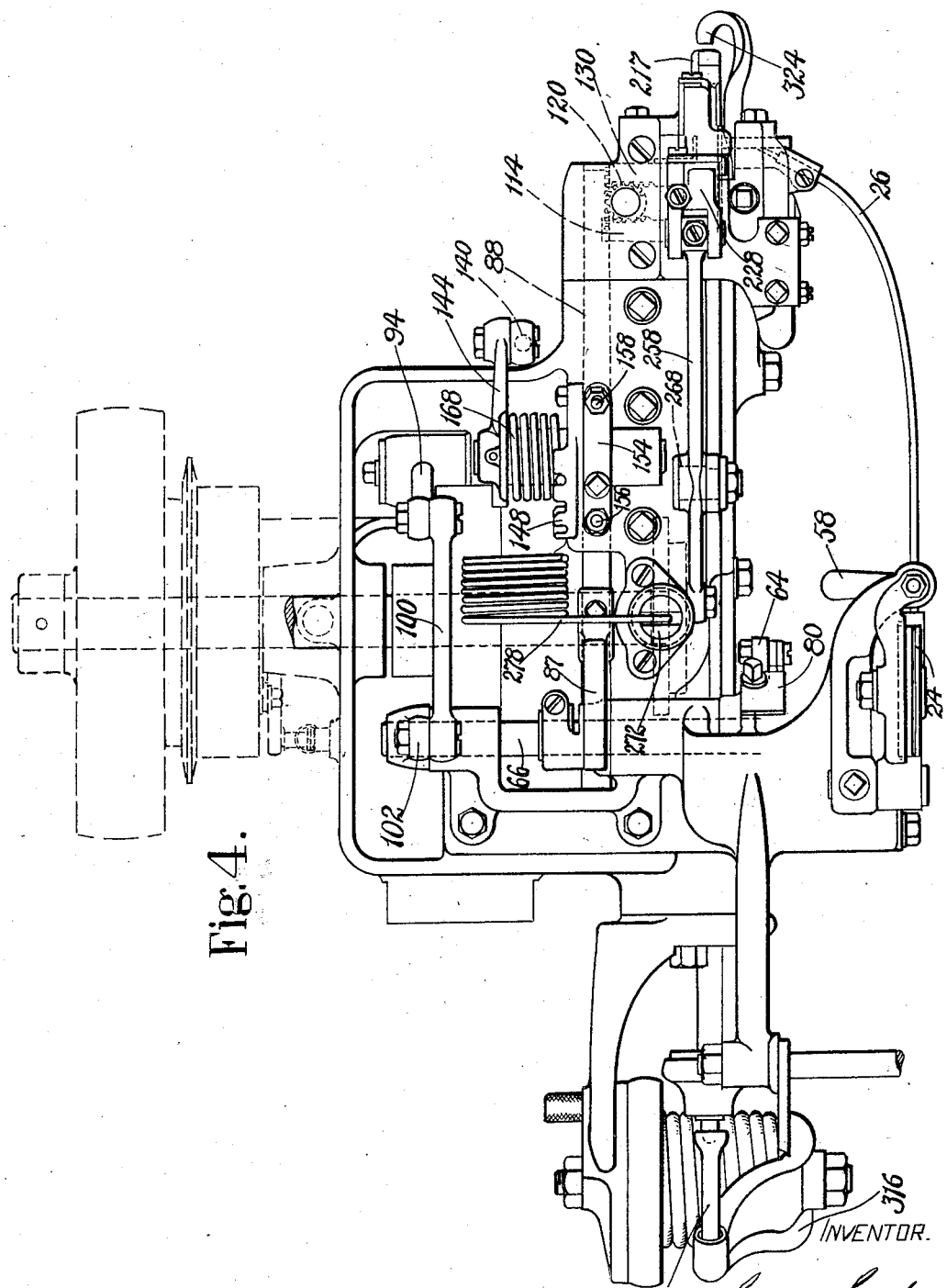
Fig. 4 is a plan view from above of the machine shown in Fig. 1.

In the illustrated machine, fastenings are formed from wire stock $w$ supported on a reel 20 (Figs. 1 and 2) from which it is fed through the operation of feed rolls 22, 24, a tube 26 being preferably provided for guiding the wire from the feed rolls to the cutting mechanism comprising cutters 28 and 30 (Fig. 10) which operate to sever lengths of wire from which fastenings may be formed. By reference to Figs. 2 and 3 more particularly it will be observed that the wire feed mechanism comprises means for intermittently rotating the feed rolls 22, 24 always in the same direction and for varying the length or amount of wire fed by the rolls. In the illustrative construction the lower feed roll 22 is mounted upon a shaft 36 supported in bearings in the frame of the machine and having fixedly secured thereto a gear wheel 38 arranged to be constantly in mesh with a corresponding gear wheel 40 which is secured to rotate with the upper roll 24 so that the upper roll is positively driven from the lower roll. Preferably, the upper roll 24 and its gear 40 are mounted upon a stub shaft 42 carried by a lever 44 pivotally mounted at 46 on the frame of the machine and having its other end 47 perforated for the passage of a bolt 48, the lower end of which passes also through the rounded end 50 of a projection secured fixedly to the frame of the machine. Between the upper surface of the end 47 and a nut 52 on the end of the bolt 48 is a spring 54 which operates to press the roll 24 against the lower roll 22. Secured to the lower end of the bolt 48 is a cam member 56 having a handle 58. When the cam projections of the cam member 56 are engaged in correspondingly shaped notches in the member 50, as shown in Fig. 2, the tension on the spring 54 is relaxed so that the end of the wire may be readily introduced between the rolls 22, 24. Upon returning the handle 58 through 90° back to the position indicated in Fig. 4 the bolt 48 is moved downwardly, thereby putting increased tension on the spring 54 and causing the rolls 22, 24 to grip the wire with sufficient firmness to feed the same. At the other end of the relatively short shaft 36 is a ratchet wheel 60 secured thereto, said ratchet wheel arranged to be operated upon by a pawl or set of pawls 62 (Figs. 2 and 3) carried at the end of an arm 64 loosely mounted on a shaft 66 supported by the frame of the machine in such manner as to be in horizontal alinement with the shaft 36. For operating the pawls 62 yieldingly in a direction to cause feeding movements of the feed rolls 22, 24 there is provided an arm 68 rigidly secured to the shaft 66 and carrying at its lower end a curved link member 70 which passes loosely through a perforation in the end of a projection 72 extending laterally from the arm 64 which carries the pawls. Between the perforated end of the projection 72 and the lock nuts 74 on the end of the link 70 is a spring 76 which is so tensioned as to cause prompt movement of the pawls 62 and ratchet wheels 60 upon rocking of the shaft 66 whereby the feed rolls 22, 24 are given their proper feeding movement. If, however, the end of the wire being fed by the feed rolls 22, 24 encounters an obstruction the spring 76 will yield sufficiently to prevent any damage to the wire or to the parts which contact therewith. Carried by the projections 72 is a pair of leaf springs 78 which press upon the pawls to hold them in contact with the ratchet wheel 60 so that they will engage properly with the teeth thereof. In order to vary the throw of the ratchet wheel 60 and thus make provision for changing the lengths of the fastenings, there is provided a controller in the form of a curved shield member 80 which extends around a portion of the periphery of the ratchet wheel 60. It will be clear that if the shield 80 be moved so as to intercept the pawls 62 in part of the path of movement of the latter that the operative stroke of the pawls will be lessened in accordance with the amount that the ends of the pawls ride over the surface of the shield. In the construction shown the shield or controller member 80 is mounted upon a sleeve 82 rotatable on the shaft 66 and provided, on a portion of its surface, with gear teeth 84 adapted to mesh with the teeth of a rack 86 carried by a block 87 mounted upon a slide bar 88. It will be clear from an inspection of Fig. 2 that movement of the slide bar 88 will be followed by movement of the shield in a direction to cover or uncover portions of the ratchet wheel 60 thereby varying the length of the effective portion of the stroke of the pawls 62. For rocking the shaft 66 there are provided connections leading back to cam 90 on the shaft 92 (Figs. 1, 4 and 7)

the said connections comprising a lever 94 loosely mounted on shaft 96 and having a roll 98 for engagement with the cam 90, the upper end of the lever being pivotally connected by a link 100 with an arm 102 fixedly secured to the end of the shaft 66. By means of a spring 104 (Fig. 7) the lever 94 is held against the cam 90 so that the lever is rocked through the operation of the cam whereby a corresponding rocking movement is transmitted to the shaft 66 and this movement in turn, through the pawl and ratchet mechanism described, transformed into an intermittent rotation of the rolls 22, 24 in one direction to cause feeding of the wire in predetermined amounts at regularly recurring intervals.

As before stated, the means for cutting the wire stock into lengths for fastenings comprises the cutters 28 and 30 (Figs. 9 and 10) cutter 28 being the stationary cutter and 30 being the cutter movable at the time of the severing of a fastening length from the wire stock. It will be observed that the cutting face of the cutter 28 is at the end of a wire guideway in the body portion of the cutter member and that the cutter 30 is a vertical blade-like member adapted to pass across the end face of the cutter 28 to sever the wire length from the wire stock. In the construction shown the cutter 30 has a flange and rib portion 108 which assists in strengthening the cutter blade and holding it firmly in place in a cutter support 110. When it is desired to change the length of the fastening the cutters 28 and 30 must be adjusted in the direction toward or away from an abutment 111 which serves as a stop to locate the end of the wire stock as the latter is fed into position prior to each cutting operation. The abutment co-operates with the feed rolls 22, 24 in determining the exact length of wire fed at each operation of the feed rolls, the end of the wire coming against the abutment serving to check any tendency to overthrow movement of the feed rolls. Hence, the cutter 28 is mounted in a block 112 which is in turn secured to a slide member 114, having at its other end, ratchet teeth 116 adapted to be engaged by teeth 118 on the lower end of a sleeve member 120, so that upon rotation of the sleeve member the slide 114 is caused to move in one direction or the other to adjust the cutter 28. This same movement of the slide 114 also moves the other cutter 30 in the same direction and to the same extent since the cutter support or block 110 which supports the cutter 30 is mounted by a tongue and groove connection shown at 122 in the slide 114 so as to partake of the lateral movement of the slide 114. A cap or cover 115 is provided to cover the cutter slides. In order that the cutter block 110 may move laterally along with the cutter 28 and still maintain its connection with an operating bar 124, the block 110 is provided with a hardened block 126 preferably to receive slidably the stud 128 extending laterally from the side of the operating bar 124. At the same time that the slide 114 is moved to the right in Fig. 10 a block 130 which carries the abutment 111 is moved to the left through the operation of the teeth 118 on the sleeve 120 in engagement with ratchet teeth 132 on the block 130. Thus, when the cutters 28 and 30 are moved to the right in Fig. 10 to shorten the fastening length of wire the abutment 111 is moved at the same time toward the cutters, so as to shorten the fastening length of wire equally on each side of the potential cross bar of the staple fastening. Preferably, and as shown, the abutment 111 is carried by a plate 134 which may be attached to the block 130 by a pin and slot connection shown at 136, thereby facilitating the setting up of these parts in proper relation to each other when the machine is assembled. For rotating the sleeve 120 to secure adjustment of the cutters in the manner already described there is provided in the construction shown a rack bar which may be, and preferably is, a part of, or integral with, the bar 88, heretofore described as employed for the purpose of varying the length of wire fed through control of the shield 80 (Fig. 2). From an inspection of Figs. 2, 9 and 10 it will be observed that movement of the bar 88 in a direction to rotate the sleeve 120 in a clockwise direction, will cause a shorter length of wire to be fed, by interposing more of the shield or controller 80 in the path of the pawls 62, at the same time that the cutters 28 and 30 and the abutment 111 are caused to approach each other to cut off a shorter fastening having legs of equal length. On the other hand, movement of the bar 88 in a direction to cause counterclockwise movement of the sleeve 120 will cause shifting of the cutters and the abutment 111 in a direction away from each other at the same time that the shield or controller 80 is moved to uncover a larger part of the ratchet wheel 60 to the action of the pawls 62, thus providing for a greater feeding movement of the feed rolls 22, 24.

According to one embodiment of the invention the slide bar 88 is arranged to be shifted by connections to a treadle so that the operator may shift from one length of staple to another at will and in accordance with his judgment as to the length of fastening required by the work. The connections between the treadle and the slide bar 88 comprise, in the construction shown, a link or rod 140 (Figs. 1 and 9) the lower end of which is adapted to be pivoted to the treadle 141, its upper end being also pivoted, as at 142, to the end of a lever 144 loosely mounted on a shaft 146 mounted in bearings in the frame of the machine. Fixed on the frame of the machine is a plate member 148 extending on opposite sides of the shaft 146 and forming a bearing for the shaft. Secured to the shaft is a segment rack 150, the teeth of which are in mesh with teeth 152 on an intermediate or body portion of the slide bar 88. Fixed to the segment rack 150, or integral therewith, is a bar 154 having in its ends, respectively, adjustable bolts 156, 158 adapted to contact with shoulders 160, 162 on a frame part or casing of the machine to limit rocking movement of the bar 154 and, therefore, of the segment rack 150. Plate 148 is provided with notches 164 in the upper arm portion thereof for engagement selectively with one end 166 of a spring 168, the other end of which is connected to the lever 144 normally to hold the lever in elevated position. When the lever is in the position shown in Figs. 1 and 9 the wire feeding and wire cutting means are in position to feed and cut a short fastening. If the treadle be depressed until the bolt 158 contacts with the seat 162 then the slide 88 will be moved to the left, through connections comprising the rack 150, and a longer fastening length of wire will be fed and cut off to make a staple fastening with longer prongs.

If preferred, a hand lever may be provided so that the operator may adjust the wire cutters and the wire feeding means through a lever shifted by hand. In fact, this hand lever may be employed in the same machine with the treadle controlled means so that the operator may have his choice of means under his control for lengthening or shortening the fastening. Conveniently, the handle control is shown as comprising a hand lever 180 (Fig. 12) secured to the upper end of the sleeve 120 so that the sleeve 120 is operated directly to effect adjustments of the cutters and of the abutment 111 with respect to each other, the slide bar 88 being operated from the sleeve instead of operating the sleeve as when the treadle is used. In other words, the slide bar 88 has the same rack and pinion connection to the upper end of the sleeve 120 as that shown in Fig. 10, the only difference being that the sleeve 120 becomes the source of power for the bar 88 when the hand lever 180 is employed by the operator. Hence, when the hand lever 180 is shifted by the operator the wire feed is controlled by the bar 88 in the manner already described. One advantage of the hand lever 180 over the treadle control is that the handle 180 may be more readily adjusted to a larger number of positions. In the construction shown in Fig. 12, a positioning bar 190 is secured to the frame of the machine and is so shaped that its outer edge 192 is concentric with the center of the sleeve 120. At each end of the positioning bar 190 is a gage block 194 each of which may be secured in adjusted position to fix the limits of the throw of the handle lever 180, thereby at the same time determining the minimum and maximum lengths of fastenings. This is what is secured by the treadle controlled mechanism through the adjustable screw bolts 156, 158 (Fig. 9). In addition, the hand lever 180 may be adjusted at intermediate points through the operation of a spring pressed bolt 200 mounted on the lower side of the handle and adapted to engage selectively in a series of notches 202 so that a fastening intermediate between the minimum and maximum fastening may be secured according to the judgment of the operator.

The fastening forming and driving devices, in the construction shown, comprise an inside former 210 (Figs. 9 and 10) which is fixed in position, being securely fastened by having a portion thereof 212 bent and firmly screwed to a projecting part or bracket 214 which is secured to, or integral with, the head portion of the machine frame (Figs. 7 and 9). The lower part of the bracket 214 provides, in the construction shown, the upper stationary plate 216 of the nose 217 of the fastening inserting mechanism. In other words, this plate 216 contains a guideway 218 for the fastening and for the driver (Figs. 8 to 11 inclusive), the lower wall of the guideway being formed by a movable member 220 which also operates as a wiper member, as will be hereinafter described. For co-operation with the inside former 210 in forming a staple fastening there is provided, in the construction shown, an outside former 222 comprising two relatively short plates 224, 226 each having a groove on its inner surface in which the wire is received as it is bent over the inside former 210. These plates 224, 226 are secured upon the lower end of a former carrier 228 which is reciprocable vertically in the operating bar 124 for a purpose that will be hereinafter described. When the operating bar 124 is moved to the right in Figs. 9 and 10 the outside former 222 is caused to approach the inside former 210 to engage the length of wire $w$ and press it against the adjacent vertical edge of the inside former 210 just at the instant the cutters 28 and 30 sever this piece from the main body of the wire stock. A plate 229 serves as a cover to confine the length of wire being cut off thereby assisting in directing the end of the wire across the edge of the inside former and into contact with the abutment 111. Continuing in its movement the outside former bends the piece of wire around the inside former 210. At the termination of this forward movement a die member 230 contacts with the cross bar of the staple pressing it firmly against the vertical end face of the inside former 210, thus making a straight cross bar on the fastening. Preferably, and as shown, the die member 230 is carried at the lower end of a plate 232 which is secured to a casing or housing member 234 at the forward end of the operating slide 124. Following the formation of the fastening the outside former 222 is moved downwardly as its carrier 228 is depressed to its lowest point so as to bring the plates 224, 226 into straddling engagement with respect to the member 220 (Fig. 11) whereby the staple carried in the grooves in the plates 224, 226 is located on the upper surface of the member 220 below the lower end of the prolongation 211 of inside former 210 and in line with a staple fastening driver 240. It will be observed that the inside former serves to keep the staple fastening in the outside former during its transfer from forming to driving position. The means for reciprocating the carrier 228 comprises an operating means having a yielding connection therein so that the outside former members 224, 226 will be sure to be brought into proper operative relation to the member 220, as just described. Referring to Figs. 1 and 9 it will be seen that the carrier 228 is provided with a forked portion 250 in which is located a block 252 having trunnions 254 for pivoting the block in the forked portion 250. Passing slidably through the block 252 is a bolt 256, the lower end of which is forked to receive the end of a lever 258 to which the bolt is pivoted. Between the upper surface of the block 252 and lock nuts 260 on the upper end of the bolt is a spring 262 which is compressed at the end of the downward movement of the carrier 228 so as to insure that the staple fastening in the outside former will be carried into engagement with the upper surface of the member 220 (Fig. 11). In order that the carrier 228 may be moved upwardly to a predetermined position so as to locate the grooves in the outside former plate 224, 226 in proper alinement with the wire $w$ there is provided on the bolt 256 a pair of lock nuts 264 to engage the under side of the block 252, the said lock nuts being adjustable so that the uppermost position of the carrier 228 may be determined during the setting up of the machine and adjusted as may be required by wearing of the parts of the operating means. Lever 258 is pivoted as at 268 (Figs. 1 and 4) upon a projection or bracket fixedly secured to the frame of the machine, the said pivot point being at a point intermediate between the ends of the lever, and the other end carrying pivotally a block 270 (Fig. 1) which is slidable transversely in a slot in the vertical slide member 272 which carries at its lower end a roll 274 for contact with a cam 276 carried by the shaft 92, the slide member 272 and its roll 274 being constantly pressed against the cam by a spring 278 (Fig. 4). It will be understood that through the co-operation of the spring 278 and the cam 276 the lever 258 will be rocked to cause reciprocation of the carrier 228 with the outside former 222. As before stated, the outside former 222 is reciprocated toward and from the inside former 210 by the operating bar 124 which is mounted for horizontal reciprocation in guideways in the frame of the machine, the means for reciprocating the operator bar comprising rack teeth 290 (Figs. 1 and 9) secured on a projection 292 from the lower side of the bar, the teeth being in mesh with teeth 294 on a segmental rack bar 296 at the upper end of lever 298. Conveniently, the lever 298 is fixed upon the shaft 96. Secured to the shaft 96 is an arm 300 (Figs. 1 and 5) having at its upper end a roll 302 for contact with a cam 304 which turns with the power shaft 92, the roll being held against the cam by a spring, not shown. Not only is the outside former 222 operated from the operating bar 124 but the movable cutter 30 is also operated through connections to the block 110 comprising the block 126 and stud 128 already described. Important features of the fastening forming means not claimed herein will be found described and claimed in applicant's copending application Serial No. 653,291, filed July 23, 1923.

For operating the fastening driver 240 there is provided a driver bar 310 carrying a block 312 (Figs. 1 and 6) adapted to be held in contact with a cam 314, fixed to the shaft 92, by means of a spring pressed lever 316 adapted to exert pressure on the driver bar 310 through a link 318. When the block 312 drops off the end 320 (Fig. 6) of the cam 314 the driver bar 310 is suddenly forced to the right in Fig. 1 by the spring which operates the lever 316, whereby the fastening driver 240 is suddenly impelled, as by a hammer blow, to drive the fastening through the nose 217 and into the work which is clamped between the end of the nose and a work supporting and clamping member 324. In Fig. 6 the lines 90$^a$, 276$^a$ and 304$^a$ indicate the paths of the centers of the rolls 98, 274 and 302 respectively.

The member 324, referred to above as a work supporting and clamping member, is conveniently of a curved hook shape so that it may be carried by a bar or other support 326 at one side of the plane of fastening insertion and still constitute no obstruction to the proper positioning of the work with respect to the operative end of the work clamping member which is positioned directly opposite and in line with the nose of the fastening inserting mechanism. Preferably, also, this end of the work support 324 will be provided with clinching cavities to turn the ends of the fastenings and thus set them the more firmly in the work. The bar which supports the work supporting and clamping member is shown at 326 and is mounted for sliding movement in guideways in the machine head indicated by dotted lines 328 (Fig. 1). For operating the bar 326 there is provided a lever 330 (Figs. 1 and 14) rotatable on a stub shaft 332 fixed in bearings in the frame of the machine, said lever having a roll 334 for contact with a cam 336 fixed to the shaft 92, the roll being held against the cam by means of a spring 350. Rigid with the lever 330 is an arm 338 having a slot 340 in which is received a pivot pin 342 carried by a block 344 which is adjustable in a guideway 346 in a cross bar extending at right angles to the body part of the bar 326, the purpose of the sliding block 344 with the pivot pin 342 being to permit adjustment between the bar 326 and its operating means comprising the arm 338. Through a relatively strong spring 350 the lever 330 is held with its roll 334 pressed against the cam 336. It will be understood that by this means the work, though varying somewhat in thickness, will be clamped against the end of the nose 217 yieldingly but with sufficient firmness to insure proper setting of the fastening. Moreover, adjustment of the pin 342 in a downward direction in the slot 340 will have the effect of putting a greater yielding pressure on the work.

As stated in the foregoing discussion the lower wall of the guideway 218 of the nose 217 is formed by the movable member 220 which also operates as a wiper member. Preferably, and as shown, the wiper 220 is carried by an extension 360 projecting from the operating bar 124 (Figs. 7 and 8) the said extension 360 comprising a removable clamp member 362 provided with teeth for engagement with corresponding teeth 364 on the wiper member 220 so that the latter may be fixedly secured in adjusted position. As shown, the upper stationary plate 216 of the nose 217 is provided with walls 366 which extend downwardly and end in flanges 368 which are inturned to engage with corresponding flanges 370 on the wiper member 220 so as to form a support and guide for the wiper member. Upon forward movement of the operating bar 124 the forwardly inclined surface 374 of the wiper member 220 will engage the work and wipe the same into desired position, smoothing the upper over the sole margin, and pounding it down to make a better shoulder and seat for the welt, in welting operations, than has heretofore been provided. It is possible to utilize the operating bar 124 for this purpose since it serves as the operating means for the outside former during its operative stroke in which the fastening is formed.

During the formation of the fastening the bar 124 moves the wiper member 220 to effect its wiping and smoothing action. Subsequently, the outside former is moved into its lower plane to carry the formed fastening into alinement with the driver 240, it being clear, therefore, that the work has been wiped into position before the fastening is driven by the operation of the fastening driver 240. It will be understood that the machine is started by depressing a treadle (not shown) at the lower end of rod 375, Fig. 5.

Figure 14:
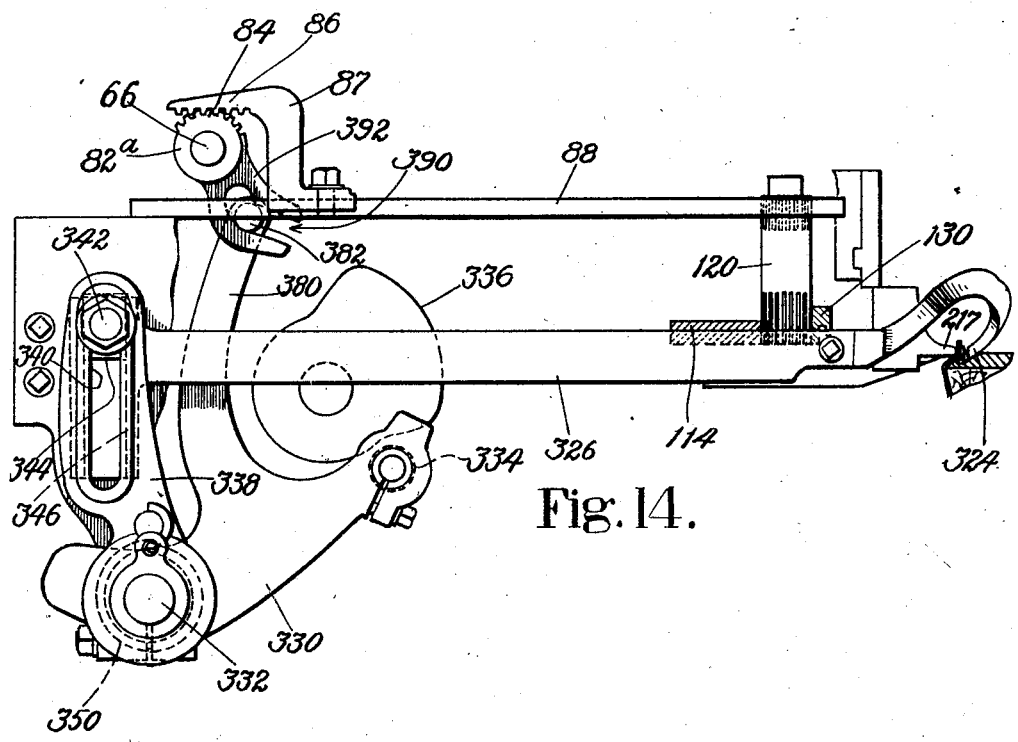
Fig. 14 is a detail view showing the connections to the movable work rest or work clamping member by which the length of fastening may be controlled in accordance with the thickness of the work at the point of fastening insertion.

Referring to Fig. 14 of the drawings it will be observed that the operating lever 330 for reciprocating the work clamping or anvil bar 326 may be provided with an extension 380 carrying a pin or stud 382 for engagement in a slot 390 provided in an arm 392 which is rigidly attached to the sleeve member 82a which is the full equivalent of the sleeve 82 of the construction shown in Fig. 2 of the drawings so that rotation of the sleeve 82a will control a shield like that shown at 80 in Fig. 2 to vary the length of the feed throw of the wire feeding rolls. Carried by the shield 82a are gear teeth 84 with which mesh the teeth of the rack 86 carried by the block 87 mounted upon the slide bar 88. Reciprocatory movement of the bar 88 results in rotary movement of the sleeve 120 with the result that the abutment block 130 and the cutter block 114 are adjusted in opposite directions just as in the constructions shown and described in connection with Fig. 10 of the drawings. While in the Fig. 10 construction the bar 88 is operated through connections leading directly to a treadle, in the mechanism shown in Fig. 14 the bar 88 is operated indirectly through means controlled by the anvil or work clamping bar 326. As the roll 334 on the lever 330 rides down on the low part of the cam 336 the stud 382 moves along the first part of the slot 390 which is concentric with the center of the shaft 332 and hence no movement is imparted to the lever 392 and to the sleeve 82a. During this time the work clamping and anvil member 324 is moving toward the nose 217 and into position to clamp the work against said nose. As the stud 382 enters the curved part of the slot 390 the work clamp 324 is contacting with the thickest work which is ever inserted into the machine as adjusted and assembled so that as the work support is moved in further toward the nose 217 the work is clamped under a yielding pressure until the work clamping member 324 finally comes to rest, thus measuring, between it and the nose 217, the work for thickness at the point where the fastening is to be inserted. The nose 217 and the clamping member 324 constitute a work calipering means operative automatically to control the lengths of fastenings in accordance with the thickness of the stock into which the fastenings are to be driven. The distance that the stud 382 moves along the curved part of the slot 390 determines the length of fastening so as to insert a fastening suitable to the thickness of work that is clamped at the point where the fastening made in that cycle of the machine is to be inserted.

While the machine illustrated in the drawings may be used for various purposes, such as stapling ornaments to shoes or in securing several layers of material together, it is designed especially for the work of securing edge portions of the uppers of shoes to the upstanding lip or rib of an insole temporarily secured to a last. In performing operations of this nature upon shoes, the end portion of the work rest 324 is inserted in the channel or angle back of the upstanding lip or rib of the insole (Fig. 13) so that upon operation of the machine the shoe is carried toward the nose 217 of the fastening inserting mechanism and clamped thereagainst while the wiper 220 with its slanting, wiping face 374 wipes the edge portion of the upper over the margin of the sole and lays it into firm contact therewith. Finally the fastening is driven along the upper surface of the wiper member 220 and inserted in the clamped upper and lip or rib. Following this, the work clamping member 324 moves outwardly to release the work so that the latter may be shifted to a new position for the insertion of a fastening in spaced relation to the preceding fastening.

Having described my invention, what I claim as new and desire to secure by Letters Patent of the United States is:—

1. In a machine of the character described, means for forming a fastening, a guideway for wire stock fed to the fastening forming means, an abutment located in the path of the wire to operate as a stop when the end of the wire contacts therewith, means for cutting off a length of wire to be operated upon by the fastening forming means, and means controlled by the thickness of the stock into which the fastening is to be driven for adjusting the cutting means and the abutment toward and from each other to determine the length of fastening in accordance with the thickness of said stock.

2. In a machine of the character described, means for forming a fastening, a guideway for wire stock fed to the fastening forming means, an abutment located in the path of the wire to operate as a stop when the end of the wire contacts therewith, means for cutting off a length of wire to be operated upon by the fastening forming means, and means controlled by the thickness of the stock into which the fastening is to be driven for adjusting the cutting means and the abutment simultaneously so as to change both legs or prongs of the fastening to an equal extent.

3. In a machine of the character described, means for forming a fastening, a guideway for wire stock fed to the fastening forming means, an abutment mounted for rectilinear movement in the path of the wire to operate as a stop when the end of the wire contacts therewith, means for cutting off a length of wire to be operated upon by the fastening forming means mounted for rectilinear movement toward and from the abutment, and means comprising a rotary member for adjusting the cutting means and the abutment rectilinearly in opposite directions with respect to each other so as to determine the length of wire cut from the wire stock to make a fastening.

4. In a machine of the character described, means for forming a fastening, a guideway for wire stock fed to the fastening forming means, an abutment located in the path of the wire to operate as a stop when the end of the wire contacts therewith, means for cutting off a length of wire to be operated upon by the fastening forming means, and automatically operating means for adjusting the abutment in directions toward and from the cutting means to vary the length of wire cut off to form a fastening of a length suited to the stock into which it is to be driven.

5. In a machine of the character described, an inside former, an outside former for co-operation with the inside former in forming a fastening, means for moving the outside former to transfer the formed fastening to the driving plane, stationary retaining means serving to prevent displacement of the fastening from the outside former during its transfer, and means for driving the fastening from the outside former.

6. In a machine of the character described, an inside former, an outside former arranged to co-operate with the inside former to form a fastening, a die operative to straighten the cross bar on the formed fastening, a carrier bar for the outside former movable to transfer the outside former away from the die and the inside former, stationary means for retaining the fastening in the outside former during transfer movement thereof, and means for driving the fastening from the outside former.

7. In a machine of the character described, means for feeding wire stock, means for cutting fastening lengths from the wire stock, an abutment against which the end of the wire is fed prior to the cutting operation, means for forming a fastening from a cut off length of stock, and means for automatically adjusting the wire feeding and cutting means and also the abutment to vary the length of the fastening in accordance with the thickness of the stock into which the fastening is to be driven.

8. In a machine of the character described, a feed wheel arranged to feed wire stock, said feed wheel having a ratchet connected thereto, a pawl arranged to drive the ratchet and thereby to rotate the feed wheel step by step, a shield between the pawl and the ratchet arranged by its adjustment to vary the effective movement of the pawl and thereby to vary the length of wire fed by the feed wheel, means for cutting fastening lengths from the wire stock, an abutment against which the end of the wire is fed prior to the cutting operation, means for forming a fastening from a cut off length of stock, and means for simultaneously adjusting the shield of the wire feeding means and the abutment to vary the lengths of the cut off pieces of stock from which fastenings of various dimensions may be made.

9. In a machine of the character described, a feed wheel arranged to feed wire stock, said feed wheel having a ratchet connected thereto, a pawl arranged to drive the ratchet and thereby to rotate the feed wheel step by step, a shield between the pawl and the ratchet arranged by its adjustment to vary the effective movement of the pawl and thereby to vary the length of wire fed by the feed wheel, means for cutting fastening lengths from the wire stock, an abutment against which the end of the wire is fed prior to the cutting operation, means for forming a fastening from a cut off length of stock, and a single means for causing adjustment of the shield of the wire feeding means and the abutment to vary the lengths of the cut off pieces of stock from which fastenings of varying dimensions may be made.

10. In a machine of the character described, means for feeding wire stock, means for cutting fastening lengths from the wire stock, a rectilinearly movable abutment against which the end of the wire is fed prior to the cutting operation, means for forming a fastening from a cut off piece of stock, and means comprising a single, movable member having connections with the wire feeding and the wire cutting means and with the abutment for controlling the means and the abutment to vary the lengths of fastenings.

11. In a machine of the character described, means for feeding wire stock, means for cutting fastening lengths from the wire stock, an abutment against which the end of the wire is fed prior to the cutting operation, means for forming a staple from a cut off piece of stock, and means automatically controlled by the thickness of the stock into which the staple is to be driven for adjusting the wire feeding means and the cutting means and simultaneously with the cutting means the abutment to vary the lengths of the staples in accordance with the thickness of the stock.

12. In a machine of the character described, means comprising feed rolls for feeding wire stock from which fastenings are to be formed, means for cutting fastening lengths from the wire stock, an abutment against which the end of the wire is fed by the feeding means, means for forming a fastening, and gearing for adjusting the cutting means and the abutment rectilinearly in opposite direction and simultaneously therewith changing the throw of the feed rolls to determine the lengths of the fastenings so as to suit the latter to differences in the thickness of the work.

13. In a machine of the character described, means for feeding wire stock from which fastenings are to be formed, means for cutting fastening lengths from the wire stock, means for forming and driving a fastening, and means comprising a toothed gear member for simultaneously adjusting the cutting means and the wire stock feeding means to determine the length of the fastening to be formed and driven.

14. In a machine of the character described, fastening forming and driving means comprising an inside former, an outside former, a fastening driver and a nose through which the fastenings are driven one at a time, said outside former being movable in one plane to form a fastening and in another plane to transfer the fastening to driving position, means for clamping a piece of work in position for the insertion of a fastening, the lower wall of the nose being formed by a movable member having an inclined forwardly pointing surface, and means for moving said member to operate on the work prior to the insertion of each fastening.

15. In a machine of the character described, an inside former, an outside former movable to form a fastening over the inside former, a die for co-operation with the inside former to straighten the cross bar of the fastening, means for moving the outside former to transfer the fastening from forming to driving position, said inside former having a prolongation which serves as a retaining means to prevent displacement of the staple during transfer thereof, and means for driving the fastening from the outside former.

16. In a machine of the character described, means for feeding wire stock, means for cutting fastening lengths from the wire stock, an abutment against which the end of the wire is fed prior to the cutting operation, means for forming and driving a staple made from a cut off piece of stock, and means for automatically adjusting the wire feeding and cutting means and the abutment in accordance with a dimension of the stock into which the staple is to be driven to vary the length of the staple to be formed and driven in the same cycle of the machine so that staples may be suited to differences in the work.

17. In a machine of the character described, means for feeding wire stock from which fastenings are to be formed, means for cutting fastening lengths from the wire stock, an abutment against which the end of the wire is fed by the feeding means, means for forming and driving a fastening, and means for simultaneously adjusting the cutting means and the abutment rectilinearly in opposite directions to determine the length of the fastening so as to suit the latter to differences in a dimension of the work.

18. In a machine of the character described, means for feeding wire stock, means for cutting fastening lengths from the wire stock, means for forming and driving fastenings formed from the severed lengths of wire, and means comprising a single toothed gear member having connections for controlling the wire feeding and wire cutting means so as to vary the length of fastening to suit differences in the thickness of the work.

19. In a machine of the character described, means for feeding wire stock, means for cutting fastening lengths from the wire stock, means for forming and driving fastenings formed from the severed lengths of wire, means comprising a single, movable member having connections for controlling the wire feeding and wire cutting means so as to vary the length of fastening to suit differences in the thickness of the work, and automatically operating means arranged to control said movable member to adjust the wire feeding and cutting means in accordance with a dimension of the stock into which fastenings are to be driven.

20. In a machine of the character described, means for feeding wire stock, means for cutting fastening lengths from the wire stock, means for forming and driving fastenings formed from the severed lengths of wire, and means comprising a single, movable member having connections for controlling the wire feeding and wire cutting means arranged automatically to vary the lengths of the fastenings to suit differences in the work.

21. In a machine of the character described, fastening forming and driving means comprising an inside former, an outside former, a fastening driver and a nose through which the fastenings are driven one at a time to secure the upper of a shoe to the sole thereof, said outside former being movable in a plane at one side of the driver to form a fastening and subsequently movable in another direction to transfer the fastening to driving position, a work rest for locating the work and supporting it against the thrust of the driving means, one wall of the nose being formed by a movable member having an inclined forwardly pointing surface, means for moving said member to wipe the shoe upper into firm contact with the sole margin as the latter is supported by the work rest and prior to the driving of a fastening into the upper and sole, and an operative connection between the outside former and the last-mentioned means for operating the outside former to form a fastening constructed and arranged to permit the described transferring movement of the outside former.

22. In a machine of the character described, fastening forming and driving means comprising an inside former, an outside former, a fastening driver, and a nose through which the fastenings are driven one by one to secure the upper of a shoe to the sole thereof, a work rest for positioning the shoe upper and sole assembled on a last and movable to clamp portions of the upper and sole against the end of the nose, said nose having one of its walls formed as a separate member, the outside former and said member being relatively movable to provide a guideway for the fastening and the fastening driver during the driving of the fastening, and means for moving said member to engage the front end thereof with the shoe upper to wipe it into firm contact with the sole margin prior to the driving of each fastening.

23. In a machine of the character described, means for feeding wire stock, means for cutting fastening lengths from the wire stock, an abutment against which the end of the wire is fed prior to the cutting operation, means for forming a fastening from a cut off length of stock, means for driving the fastening into work, and means controlled by the work for simultaneously adjusting the wire feeding and cutting means and also the abutment to vary the length of the fastening.

24. In a machine of the character described, means for feeding wire stock, means for cutting fastening lengths from the wire stock, an abutment against which the end of the wire is fed prior to the cutting operation, means for forming a fastening from a cut off length of stock, means for driving the fastening into work, and means controlled by the work for simultaneously adjusting the wire feeding means and the abutment to vary the lengths of the cut off pieces of stock from which fastenings of various dimensions may be made.

25. In a machine of the character described, means for forming a fastening, a guideway for wire stock fed to the fastening forming means, an abutment located in the path of the wire to operate as a stop when the end of the wire contacts therewith, means for cutting off a length of wire to be operated upon by the fastening forming means, means for calipering the work, and means controlled by the calipering means for adjusting the cutting means and the abutment simultaneously so as to change both legs or prongs of the fastening to an equal extent.

26. In a machine of the character described, means for forming a fastening, a guideway for wire stock fed to the fastening forming means, an abutment located in the path of the wire to operate as a stop when the end of the wire contacts therewith, means for cutting off a length of wire to be operated upon by the fastening forming means, means for calipering the work into which the fastening is to be driven, and means controlled by the calipering means for adjusting the abutment in directions toward and from the cutting means to vary the length of wire cut off to form a fastening.

27. In a machine of the character described, means comprising feed rolls for feeding wire stock from which fastenings are to be formed, means for cutting fastening lengths from the wire stock, an abutment against which the end of the wire is fed by the feeding means, means for forming a fastening, means for driving the fastening into work, and means controlled by the work for adjusting the cutting means and the abutment in opposite directions and simultaneously therewith changing the throw of the feed rolls to determine the length of the fastenings so as to suit the latter to differences in the thickness of the work.

28. In a machine of the character described, means for feeding wire stock from which fastenings are to be formed, means for cutting fastening lengths from the wire stock, an abutment against which the end of the wire is fed by the feeding means, means for forming and driving a fastening, means for calipering work into which fastenings are to be driven, and means controlled by the calipering means for simultaneously adjusting the cutting means and the abutment in opposite directions to determine the length of the fastenings so as to suit the latter to differences in the thickness of the work.

29. In a machine of the character described, means for feeding wire stock from which fastenings are to be formed, means for cutting fastening lengths from the wire stock, means for forming a fastening and driving it into work, comprising a nozzle through which the fastening is driven, a member for clamping the work against the end of the nozzle, a lever for operating the clamping member, and a rotary member associated with the wire feeding means and having connections for adjusting both the wire feeding means and the cutting means so as to vary the length of the fastening to suit the same to the thickness of the work clamped against the nozzle.

30. In a machine of the character described, means comprising a shaft for feeding wire stock from which fastenings are to be formed, means for cutting fastening lengths from the wire stock, an abutment against which the end of the wire is fed by the feeding means, means for forming a fastening and driving it into work, said forming and guiding means comprising a nozzle through which the fastenings are driven, a member for clamping the work against the end of the nozzle, a lever for operating the clamping member, a sleeve on the wire feeding shaft arranged to be operated by said lever, and connections from said sleeve for adjusting simultaneously the wire feeding and cutting means and also said abutment to determine the length of the fastening to suit the same to the thickness of the work at the point of fastening insertion.

In testimony whereof I have signed my name to this specification.

GEORGE GODDU.